US012350734B2

(12) United States Patent
Steele

(10) Patent No.: US 12,350,734 B2
(45) Date of Patent: Jul. 8, 2025

(54) RECOVERING SAND, BENTONITE AND ORGANICS FROM FOUNDRY SAND WASTE

(71) Applicant: IMERYS USA, INC., Roswell, GA (US)

(72) Inventor: Robert C. Steele, Ponte Vedra Beach, FL (US)

(73) Assignee: Imerys USA, Inc., Roswell, GA (US)

( * ) Notice: Subject to any disclaimer, the term of this patent is extended or adjusted under 35 U.S.C. 154(b) by 1106 days.

(21) Appl. No.: 17/261,683

(22) PCT Filed: Jul. 19, 2019

(86) PCT No.: PCT/US2019/042642
§ 371 (c)(1),
(2) Date: Jan. 20, 2021

(87) PCT Pub. No.: WO2020/018928
PCT Pub. Date: Jan. 23, 2020

(65) Prior Publication Data

US 2021/0292224 A1 Sep. 23, 2021

Related U.S. Application Data

(60) Provisional application No. 62/701,286, filed on Jul. 20, 2018.

(51) Int. Cl.

| | |
|---|---|
| ***B22C 5/18*** | (2006.01) |
| ***B03B 7/00*** | (2006.01) |
| ***B07B 11/02*** | (2006.01) |
| ***B22C 1/18*** | (2006.01) |

(52) U.S. Cl.
CPC ................ *B22C 5/185* (2013.01); *B03B 7/00* (2013.01); *B07B 11/02* (2013.01); *B22C 1/181* (2013.01)

(58) Field of Classification Search
CPC ................................. B22C 5/18; B22C 5/185
USPC ............................................................. 164/5
See application file for complete search history.

(56) References Cited

U.S. PATENT DOCUMENTS

| | | | |
|---|---|---|---|
| 5,163,562 | A | 11/1992 | Wilhelm et al. |
| 2002/0029592 | A1 | 3/2002 | Yamazaki et al. |
| 2003/0145972 | A1 | 8/2003 | Steele et al. |

FOREIGN PATENT DOCUMENTS

| | | | |
|---|---|---|---|
| JP | 2004-532129 A | | 10/2004 |
| WO | WO-2017-030899 | A1 | 2/2017 |
| WO | WO-2020/018928 | A1 | 1/2020 |

OTHER PUBLICATIONS

Chinese Search Report from the National Intellectual Property Administration (People's Republic of China) in counterpart Chinese Patent Application No. 201980062076.8 dated Mar. 28, 2022, 3 pages.

(Continued)

*Primary Examiner* — Kevin E Yoon
*Assistant Examiner* — Jacky Yuen
(74) *Attorney, Agent, or Firm* — RENNER, OTTO, BOISSELLE & SKLAR, LLP

(57) ABSTRACT

Both a hydraulic (wet) separation process and a dry separation process are used in combination to recover sand, bentonite clay and organics from foundry waste created during operation of a green sand foundry. These recovered ingredients are then recycled for reuse in making additional green sand molds.

19 Claims, 3 Drawing Sheets

(56) References Cited

OTHER PUBLICATIONS

Chinese First Office Action from the National Intellectual Property Administration (People's Republic of China) in counterpart Chinese Patent Application No. 201980062076.8 dated Mar. 28, 2022, 13 pages.
International Search Report issued Oct. 10, 2019, in International Application No. PCT/US2019/042642.
European Supplementary Search Report for counterpart European Application No. EP 19838138, dated Mar. 3, 2022 (9 pages).
Office Action (with English translation) dated Jun. 26, 2024 from related/corresponding Brazilian Patent Appl. No. BR112021001116-1.
Technical Examination Report issued in related Brazilian Patent Application No. BR112021001116-1 dated Oct. 14, 2024 along with an English-language translation of relevant parts.
Technical Examination Report issued in related Brazilian Patent Application No. BR112021001116-1 dated Feb. 13, 2025 with English translation of relevant parts.

Green Sand Foundry Process Flow

RECOVERING SAND, BENTONITE AND ORGANICS FROM FOUNDRY SAND WASTE

This application is a U.S. national phase entry under 35 U.S.C. § 371 from PCT International Application No. PCT/US2019/042642, filed Jul. 19, 2019, which claims the benefit of priority of U.S. Provisional Patent Application No. 62/701,286, filed Jul. 20, 2018, from both of which this application claims priority and both of which are incorporated herein by reference.

TECHNICAL FIELD

This PCT International Application claims the benefit of priority of U.S. Provisional Application No. 62/701,286, filed Jul. 20, 2018, the subject matter of which is incorporated herein by reference in its entirety.

This disclosure relates generally to the field of sand cast molding and to improvements in the founding of metals. This disclosure also relates to improvements in sand molding media employed in forming molds into which molten metal is poured in the production of castings through recovering the molding waste for recycling into sand molding additives and molding compositions.

BACKGROUND

Green sand casting is a well-known process for forming cast metal articles. In this process, a casting mold for making castings is formed from molding media that is primarily sand and bentonite clay for the production of one or multiple castings. Once the casting solidifies in the mold, the mold is broken down and the casting cycle is complete. Molding media can be recycled for another casting process; however, a substantial portion of the molding media exits the foundry as foundry waste. In the U.S. alone, foundry waste accumulates at a rate of approximately 6 to 10 million cubic yards per year. The large volume of foundry waste coupled with the increasing cost of landfill acreage and transportation is problematic. Foundry waste can contain up to 90% reusable molding medium.

Founding is an ancient art in which a cavity is defined in a sand mold and then molten metal poured therein. After the metal cools, the cast article is removed, with the sand mold usually being broken up in the removal process. The usual and basic procedure for forming such sand molds is to compact a sand molding medium around a pattern and then to remove the pattern, leaving a cavity having the configuration of the pattern.

In order for the sand to maintain its molded, cavity-defining configuration, a binding agent that causes the sand particles to cohere is included in the mixture. Clay has long been an accepted and suitable binding agent. Clay is a generic term and encompasses a large group of hydrous aluminosilicate minerals. Individual mineral grains vary in size down to microscopic dimensions. When dampened, clay is tenacious and plastic. When dampened and then dried clay becomes hard, particularly when dried at elevated temperatures. Wet bentonite product performs better under casting conditions.

The processes disclosed herein may be particularly useful in founding where so-called green sand casting is a standard practice. Green sand casting encompasses a process wherein molten metal is poured into a sand mold while it still retains the moisture that has been added to actuate the cohesive properties of the clay. Sand molding media for iron founding comprise three basic components, namely sand, clay, and finely ground a bituminous coal, commonly known in the trade as "sea coal." In some cases, small quantities other organic mineral additives can be added to improve molding medium performance. In use, a sand molding medium is moistened with water to provide a medium that is capable of being compacted around a pattern to form a mold cavity. The green sand molds typically comprise by weight, from about 86% to 90% sand and multiple non-sand components, including 8% to 10% bentonite clay, 2% to 4% organic compounds, and 2% to 4% moisture. After removal of the pattern, molten iron is poured into the mold cavity while the sand molding medium is still in its dampened or "green" condition. The sea coal on and immediately adjacent the mold cavity surface decomposes under the heat of the molten iron as it is poured into the mold. A product of this decomposition is elemental carbon, in the form of graphite, at the interface between the mold cavity and the poured iron. This elemental graphite serves the primary function of enabling the solidified casting to be released from the mold, free of sand particles. A secondary benefit of the elemental graphite is that it tends to level the surface of the mold cavity, thereby producing a smoother surface on the cast article.

A foundry may purchase a "pre-mix," which includes a clay component and carbon component. The foundry then mixes the pre-mix with sand from a local source to provide the sand molding media used in operations.

Sufficient cohesive strength of the sand molding medium is most critical in its "green" condition, that is, when it is moistened. After being compacted to define a cavity, the green molding medium preferably has sufficient strength to withstand any forces incident to removal of a pattern, so that the cavity configuration is maintained intact. Next, sand molding media, when in a green stage, preferably has sufficient strength to withstand the forces incident to the mold being moved and repositioned in various fashions in the process of preparing it for the pouring of metal into the cavity. Further, the sand molding media preferably has sufficient cohesive strength to withstand the hydraulic forces incident to pouring molten iron into the cavity.

Drying of a green mold occurs extremely rapidly and can occur while the metal is still molten and continues to exert hydraulic forces on the mold structure. The dry strength of the molding medium is therefore critical in assuring that the integrity of the mold will be maintained to the end of obtaining cast articles of the proper configuration.

Another significant, objective characteristic of sand molding media is permeability. A relatively high permeability is preferred in order to prevent damage to the mold when molten iron is poured into the mold cavity. This is to point out that when molten metal is poured into the mold cavity, air is displaced through the molding medium. More importantly, because the sand molding medium is damp, steam can be generated in a rather violent, or explosive, fashion. Such steam is preferably vented through the molding medium with a minimum of gas flow resistance. As such, porous mold structures preferably have a relatively high gas permeability. Strength characteristics and permeabilities are capable of objective determination, and acceptable green and dry strengths for sand molding media, as well as permeabilities, are now established.

After an item has been cast, the sand mold is broken up and then accumulated for reuse. The excess molding media, that is, foundry waste which cannot be reused for subsequent casting cycles is known as "molding waste". The phrase "molding waste" refers to the excess molding media from broken-down green sand molds and cores, which can be output as a stream produced during shakeout. In many green sand foundries, the molding waste typically contains by weight from about 80% to about 90% sand, from about 6% to about 10% bentonite clay, and from about 1% to about 4% organic compounds. Molding waste includes sand that is coated with bond as well as individual particles of sand, bentonite, and organic compounds.

Attempts have been made to reduce the accumulation of molding waste by mechanical reclamation removing the bond from the sand so that the sand is sufficiently clean to be reused in the production of cores. In such processes the sand is recovered, but the bentonite clay, which costs several times more than sand on a weight basis, and the organic compounds cannot usually be recovered. A disadvantage of mechanical reclamation is that the cost of prime sand is sufficiently low in many geographic areas that the capital investment for sand recovery is economically unfeasible.

In addition to molding waste, excess foundry green molding sand (wet) that is generated in the metal casting process can be disposed of as another foundry waste stream. This so called "overflow green sand" waste stream generally comprises excess green sand including both the silica molding sand and associated molding sand additives in the relative proportions used in the foundry.

Another source of foundry waste includes fine particles of sand, bentonite clay, organic compounds, and debris collected in the foundry's air evacuation system. This foundry waste is commonly known in foundries as "bag house dust." Bag house dust contains substantially more bentonite clay than does molding waste since the bentonite clay is finer than the sand used in the casting process and thus more easily transported in the air. Bag house dust typically comprises from about 40% to about 70% sand, from about 20% to about 50% bentonite clay, and from about 10% to about 30% organic compounds.

The materials from the sand mold material are generally discarded after use due to exceeding the mass balance of the sand system and the changing molding requirements to meet each of the foundries customer unique casting design. Mass balance in a molding system is defined as the sum of the new sand, core sand, and molding sand in the molding system for each molding cycle. Due to different casting designs and the required core sand needed to support cores used in each molding cycle the total amount of sand in the molding sand system can exceed the molding system capacity and will thus need to be discarded at the end of each molding cycle. As a result, more than 10% of sand mold material per ton of metal poured can be discarded by a single foundry per day. This discarded material can result in significant waste and increased cost to the foundries due to disposal and landfill expenses.

Accordingly, it may be desirable to reduce the amount of foundry waste exiting a green sand foundry. It may be desirable to provide a process to recover sand that has a sufficient quality to be used in the foundry to make cores and green sand molds that can be used in subsequent casting processes. It may also be desirable to provide a process to recover non-sand components of the green sand molds to decrease the amount of new prime materials (pre-mix) that enter the foundry as raw material. It may further be desirable to provide a green sand mold composition with improved processing properties.

As described in commonly-assigned U.S. Pat. No. 6,554,049, a significant additional portion of this used molding media can be recovered and recycled for reuse by subjecting bag house dust captured by the air evacuation system of the foundry to a first hydraulic (wet) separation in which coarse sand is recovered followed by a second hydraulic separation in which bentonite clay and organics are recovered. Reusing these materials can substantially reduce the amount of foundry waste produced as well as the amounts of additional raw materials-sand, bentonite clay and organics-needed to make additional molds and cores.

SUMMARY

In accordance with this invention, it has been found that the amounts of sand, bentonite and organics recovered for reuse in such a process can be further increased significantly by using both a wet (hydraulic) separation process and a dry separation process to treat the bag house dust generated by the foundry. In particular, it has been found that, by using the combination of a wet separation process and a dry separation process, more of these useful ingredients can be recovered for reuse in making new molds and cores than can be recovered by using either a wet separation process alone or a dry separation process alone.

Accordingly, in one aspect, this invention provides an improved process for recovering sand, bentonite clay and organic compounds from the foundry waste produced by a green sand foundry, the process comprising subjecting a first portion of foundry waste to hydraulic separation thereby producing an aqueous fraction rich in bentonite and organic compounds and an underflow fraction rich in coarse sand, subjecting a second portion of foundry waste to dry separation thereby producing a heavy fraction containing coarse sand and a light fraction containing bentonite and organic compounds, and using at least a portion of the bentonite and organic compounds from the aqueous fraction and the light fraction as a raw material for making green sand molds.

In other aspects, the foundry waste can include one or more of molding waste, overflow green sand, or bag house dust. In another aspect, the process can comprise using the coarse sand in the underflow stream and/or the coarse sand in the heavy fraction for making green sand molds.

In yet another aspect, the process can include combining the bentonite and organic compounds from the light fraction with an aqueous liquid before being used for making green sand molds. For example, the process can include combining the bentonite and organic compounds in the light fraction with the aqueous fraction before being used for making green sand molds.

In another aspect, the hydraulic separation step can include at least one of flocculation, decanting, use of a cyclone, and centrifugal separation. When the hydraulic separation step includes flocculation, it can further include addition of a polymeric flocculant.

In another aspect, the green sand molds prepared in accordance with the process can have any of a number of beneficial properties. For example a green sand mold prepared using the recovered bentonite and organic compounds can have one or more of the following: a compactability greater than about 45%, a green compression strength greater than about 15.5 N/cm2, a green shear strength greater than about 3.5 N/cm2, a permeability greater than about 65, a dry compression strength greater than about 36 N/cm2, a cone jolt toughness greater than about 23, and/or a friability less than about 7.4%.

In yet another aspect, the organic compounds can include at least one of coal or lignite.

In a further aspect, a method of forming a molding sand additive is provided, comprising the steps of: subjecting a first portion of foundry waste to hydraulic separation thereby producing an aqueous effluent stream rich in bentonite and organic compounds, and an underflow stream rich in coarse sand, subjecting a second portion of foundry waste to dry separation thereby producing a heavy fraction containing coarse sand, and a light fraction containing bentonite and organic compounds, and combining the bentonite and organic compounds in both the aqueous effluent stream and the light fraction. In some aspects, the method further includes forming a molding sand additive from the recovered bentonite and organic compounds.

In yet another aspect, a method of molding a metal part is provided, the method comprising: providing a molding medium comprising a recovered non-sand fraction and a sand fraction, said recovered non-sand fraction comprises a non-sand fraction recovered by hydraulic separation and a non-sand fraction recovered by dry separation, forming a green sand mold from the molding medium; and adding a molten metal to the green sand mold.

BRIEF DESCRIPTION OF THE DRAWINGS

This invention may be better understood by reference to the following drawing in which.

DETAILED DESCRIPTION

Figure 1:
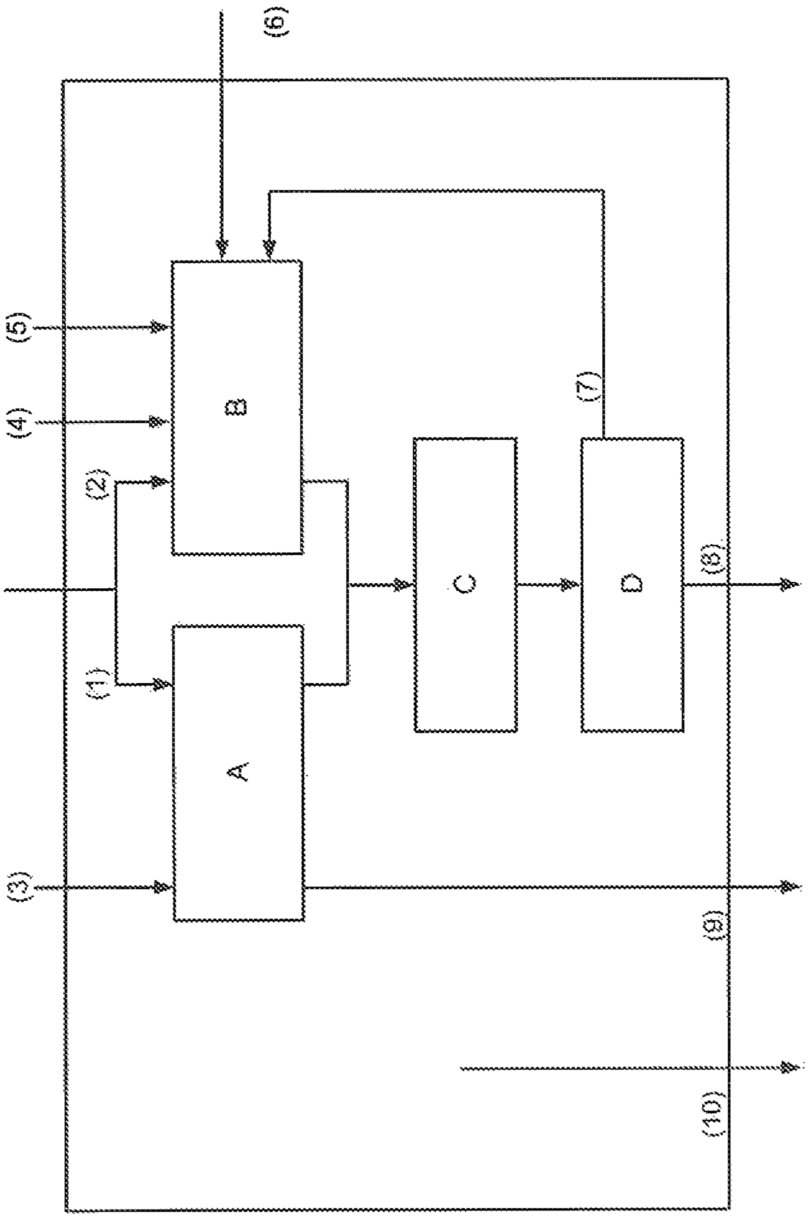
FIGURE 1 PRIOR ART
FIGS. 1 and 2 are flow diagrams which illustrate the recovery process of the aforementioned U.S. Pat. No. 6,554,049.

It is to be understood that the figures and descriptions of the present disclosure have been simplified to illustrate elements that are relevant for a clear understanding of the disclosure, while eliminating for purposes of clarity, other elements that may be well known or understood by those of skill in the art.

The present disclosure describes systems and methods that reduce overall waste at casting facilities while at the same time providing valuable recovered materials, such as molding sand additives, used in cast molding. The process of breaking used sand molds after casting results in a significant volume of waste products. Some of that waste (molding waste) is unable to be reused in generating new sand molds and is handled manually for discarding.

A large volume of foundry waste, however, can be captured by the foundry's air evacuation system, for example, when air from the foundry facility is captured and passed through a large filtration system called a bag house. The solid particles collected there are generally referred to as "bag house dust" and are made up of substantial amounts of clay and organic compound, in addition to sand. In some instances, bag house dust may typically include from about 15 wt % to about 70 wt % by weight sand, from about 20 wt % to about 85 wt % by weight bentonite clay, and from about 10 wt % to about 40 wt % by weight organic compounds. The high levels of bentonite clay and organic compounds present in bag house dust make it a potentially valuable source of raw materials for additives used in green cast molding.

Foundry waste can also be captured in the form of green overflow sand or molding waste. "Molding waste" may be captured when green sand molds and cores are broken down after casting. In some green sand foundries, the molding waste may contain from about 80% by weight to about 90% by weight sand, from about 6% to about 10% by weight bentonite clay, and from about 1% to about 4% by weight organic compounds. Molding waste includes sand that is coated with bond as well as individual particles of sand, bentonite, and organic compounds. "Green overflow sand" refers to excess foundry green molding sand (wet) that is generated in the metal casting process.

In one embodiment, the methods and systems of this disclosure may optionally utilize one or more of captured bag house dust, molding waste, or green overflow sand to generate a dry molding sand additive, for example for use as a component of a foundry pre-mix. Dry refers to a feeling (touch), not moisture free. Commercial molding sand additive typically has a maximum of 15% moisture content. For this patent application purpose the "dry" molding sand additive would be similar, however with a maximum of 30% moisture content, such as a maximum of 20% moisture content.

In one aspect, the methods and systems of this disclosure may utilize one or more of captured bag house dust, molding waste, or green overflow sand to generate a molding sand additive for cast molding, either to be recycled directly to a new molding medium or to a new premix composition. For example, the sand and non-sand fractions of the bag house dust, molding waste, or green overflow sand are separated from one another using methods known in the art. This separation may allow for adjusting of component levels in the non-sand fraction in the molding sand additive. The high levels of clay and organic compounds found in the raw or separated non-sand fraction allow recovered molding waste products to provide important components for casting compositions that can be reused or recycled with non-recycled or "fresh" materials, such as non-recycled non-sand fractions or non-recycled sand fractions. In some embodiments, the resulting molding sand additive or molding sand composition may include components of previously recycled non-sand or sand fractions.

In some embodiments, the non-sand fraction of the molding waste may have low levels of other impurities (e.g., sulfur) when compared to commercially available pre-mix and thus represents an improvement over the prior art. In some embodiments, the sulfur may be less than 0.03% by weight of the mixture.

In some embodiments, the collected molding waste may be separated using a hydraulic separation process, either alone or in combination with other separation processes.

In some embodiments, the water content of the recovered molding waste may be optionally be reduced through dewatering processes, such as, for example, spray drying, flocculation, hydraulic separation, and/or cross-flow filtration. Water reduction may reduce the moisture content of the molding sand additive to between 0% and 20%. According to some embodiments, the moisture content of the non-sand fraction may be kept at above 20%, or above about 25%, to maintain beneficial properties of hydrated bentonite in the non-sand fraction.

A slurry of recovered material for use in a molding sand additive or molding sand composition may contain a sand component, a non-sand component, or a combination of both components. If desired, the slurry may be dewatered partially or completely according to a specific requirement for a casting process.

The relative levels of various components found in the non-sand fraction of the recovered portion of the molding waste may be adjusted by addition of clay or organic compounds to achieve the appropriate concentrations to form a molding sand additive having desired properties. The addition of clay or organic components may include non-recycled or "fresh" clay or organic compounds that are not recovered from a sand molding process. According to some embodiments, the addition of clay or organic components may include previously recycled clay or organic components from a sand molding process. The specific amount of additives will depend on the specific composition of the recovered portion of the molding waste, and will depend on the requirements of the new molding sand composition dictated by customers or the needs of the next casting. The pH of the molding sand additive is generally basic and may be in the range of a pH of about 7 to about 11. Once established, the molding sand additive may be combined with molding sand that has been previously used in a casting process to generate new molding sand able to be used effectively in casting processes.

According to some embodiments, the use of recycled non-sand fractions from molding waste may improve the properties of the molding sand additive, such as, for example, by increasing one or more of the green compression strength, the green shear strength, the permeability, the dry compression strength, and/or the cone jolt toughness. The use of recycled non-sand fractions from molding waste may improve the properties of the molding sand additive, such as, for example, by decreasing the friability of the molding sand additive.

Several specific examples are provided. Each example includes a batch of sand molding medium for forming moldings to be used in the casting of iron articles, although other metals could be cast. The batches of sand molding media in the several examples have commonalities, which facilitate an appreciation of the improvements of the present disclosure.

FIG. 1 illustrates a typical green sand casting process in which prime (i.e., new) silica sand 1 and chemical binder 3 are used to produce cores in core-forming step A, while silica sand 2, bentonite clay 4 and organic compounds 5 are used to produce green sand molds at mold-forming step B. Green sand molds are made by press forming sand that is coated by a mixture of bentonite and organic compounds, generally known as “bond.” The addition of water from input stream 6 hydrates the bond and causes the grains of sand to adhere to one another and take shape. The green sand molds typically comprise by weight, from about 86-90 wt. % sand, 8-10 wt. % bentonite clay, 2-4 wt. % organic compounds and 2-4 wt. % moisture.

After casting in step C, the green sand mold/core in which the casting was made is broken apart into small particles or clumps in shakeout station D. Some of this used molding media, represented by output stream 7, is recycled to mold-forming step B for making additional green sand molds, while the remainder is discharged to waste through output stream 8. Prime (new) sand 2, prime (new) bentonite clay 4 and prime (new) organic compounds 5 which are added at mold-forming step B compensate for the sand, bentonite clay and organics which are lost to the system through output stream 8 and other places.

The waste products produced by a typical green sand foundry, “foundry waste,” usually include “molding waste” and “bag house dust”. “Molding waste” includes used molding media in output stream 8 from shakeout station D, molding waste formed from unused or defective molds and cores such as exemplified by molding waste 9 and molding media which falls from conveyor systems at various places throughout the foundry. In many green sand foundries, molding waste typically contains about 80-90 wt. % sand, about 6-10 wt. % bentonite clay and about 1-4 wt. % organic compounds.

Meanwhile, “bag house dust,” which is in the form of fine particulates, typically contains about 40-70 wt. % sand and about 10-30 wt. % organics. In addition, it also typically contains about 20-50 wt. % bentonite clay, which is substantially more than contained in molding waste.

Although various attempts have been made to recover and recycle sand, bentonite and organics from molding waste and bag house dust, none has proven to be especially successful, as a practical matter.

Figure 2:
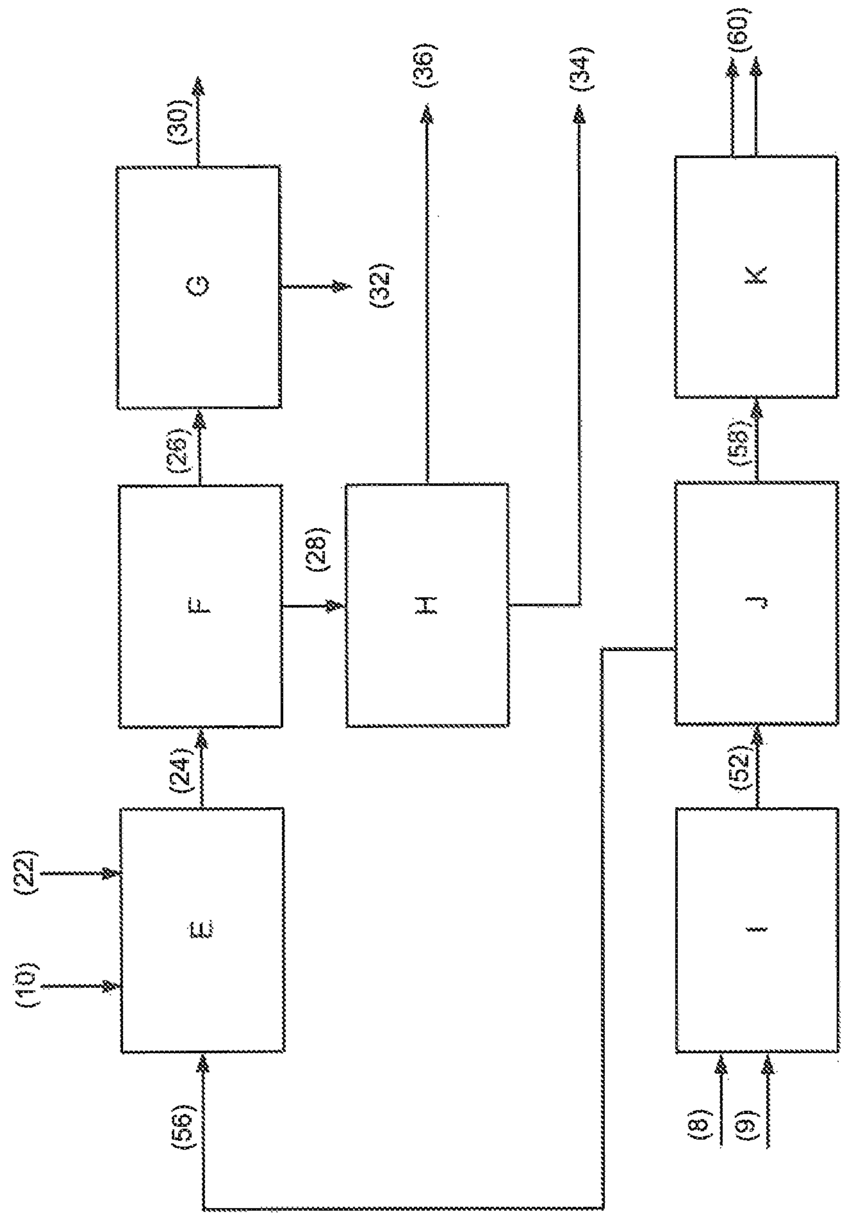
FIGURE 2 PRIOR ART

FIG. 2 illustrates an exemplary recovery process in which a series of hydraulic (wet) separation steps are used to recover and recycle substantial amounts of the useful components contained in the bag house dust found in a typical green sand foundry. As shown in FIG. 2, bag house dust 10 and water 22 are mixed in slurry step E to produce slurry 24, which is then transferred to first separation step F where it is hydraulically separated into underflow stream 28 and overflow stream 26. Underflow stream 28 contains the coarser, heavier sand particles originally present in slurry 24 and normally contains at least 40%, and more typically 50 to 80%, of the sand originally present in this slurry. Meanwhile, overflow stream 26 normally contains at least about 60% of the bentonite clay in slurry 24.

After dewatering in dewatering step H, the coarser, heavier sand particles in underflow stream 28 are recycled at 34 to mold forming step B while the water in underflow stream 28, which contains small amounts of bentonite and organics, is recycled at 36 also to mold forming step B. If desired, the coarser, heavier sand particles in underflow stream 28 can be dried and recycled to core forming step A rather than to mold forming step B.

Meanwhile, overflow stream 26 may be sent to second separation step G where it is hydraulically separated into waste stream 32 and effluent output stream 30. Depending on the composition of bag house dust 10 as well as how first hydraulic separation step F is operated, effluent overflow stream 26 may contain a significant amount of sand whose particle size is too fine to be used in making additional green sand molds, about 20 microns or less. Therefore, overflow stream 26 is processed in second hydraulic separation step G to remove this fine sand content as well as other debris that may be present in this stream.

Separation step F may be carried out so that at least about 60 wt. % of the bentonite clay in slurry 24, such as for example about 70 to 95 wt. % of the bentonite clay and 70 to 90 wt. % of the organics in slurry 24, are recovered in overflow stream 26. This means that effluent output stream 30 typically contains much of the bentonite clay and organic compounds originally present in overflow stream 26 as well no more than about 5 wt. %, no more than about 3 wt. % or even no more than about 1 wt. % of the sand originally contained in the overflow stream 26. In addition, also means that effluent stream will typically contain at least about 50 wt. %, more typically at least about 70 wt. % or even 85 wt. % of the bentonite originally present in slurry 24. Since most of the retained bentonite clay in overflow stream 26 is “active” in the sense that it will exhibit some active binding properties when dehydrated then rehydrated, effluent output stream 30 is recycled to mold forming step B for making additional green sand molds.

As further described in U.S. Pat. No. 6,554,049, the molding waste produced by a typical green sand casting process (FIG. 1) such as molding waste 8 derived from shake out step D and molding waste formed from unused or defective molds and cores such as exemplified by molding waste 9 can also be treated by the hydraulic separation process of this patent. This is also illustrated in FIG. 2 which shows that, after undergoing an initial drying, screening and demagnetizing step I, these wastes are mechanically separated at mechanical separation step J to produce a lighter fraction (residual stream 56 in FIG. 2) and a heavier fraction (output stream 58). Residual stream 56, which is composed of sand, bentonite clay and organic compounds, is recycled to slurry step E where it is combined with fresh bag house dust and water, after which it is subjected to first and second hydraulic separation steps F and G. Meanwhile, output stream 58, which is composed primarily of coarse sand, after being washed and dried in finishing step K, is recycled as output stream 60 to core-forming step A.

Figure 3:
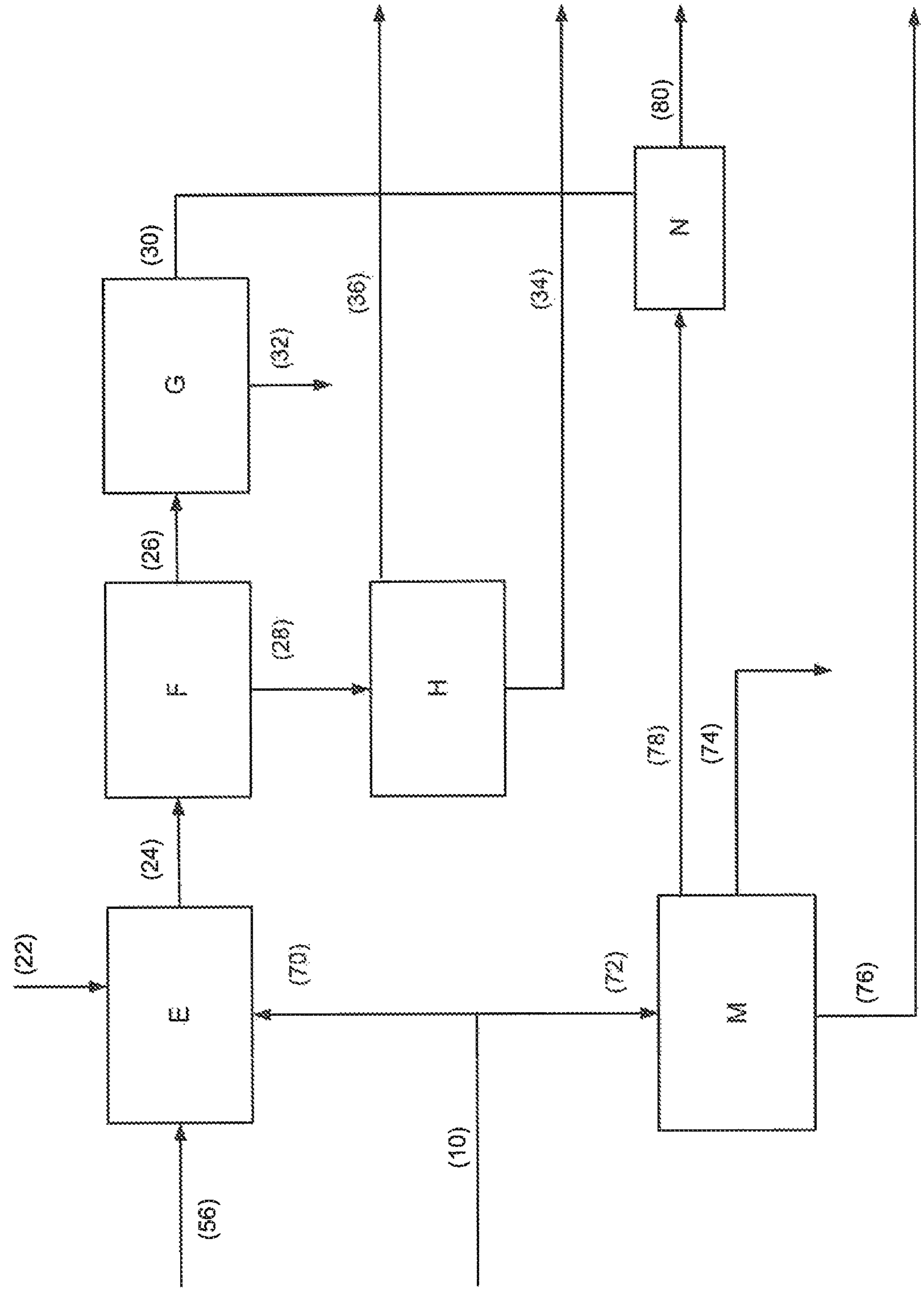
FIG. 3 is a flow diagram similar to FIG. 2, which illustrates the inventive recovery process.

One aspect of the inventive process is illustrated in FIG. 3, which shows bag house dust from supply line 10 being split into two portions, a first portion being transferred through supply line 70 to slurry step E for producing slurry 24 and a second portion which is transferred through supply line 72 to dry separation station M. This station may be composed of one or more cyclones or any other type of equipment which is capable of separating a particulate mixture into separate fractions based on size, density or both. In accordance with this invention, bag house dust can be separated into at least two different fractions in dry separation station M, a light fraction 78 composed primarily of bentonite and carbon, a heavy fraction 76 composed primarily of coarse and medium grade sand and optionally an intermediate fraction 74 composed primarily of fines which are unsuitable for use in making additional cores and/or molds.

As shown in FIG. 3, intermediate fraction 74 is discharged to waste, while heavy fraction 76 is recycled to mold forming station B, either separately or after being combined with coarse sand 34 exiting dewatering station H. Meanwhile, light fraction 78 is also recycled to mold forming station B. In the particular embodiment shown, light fraction 78 is fed to slurry station N where it is combined with effluent output stream 30 exiting second hydraulic separation step G to form slurry 80 before being returned to mold forming station B. However, light fraction 78 can also be separately returned to mold forming station B, if desired, for example after being combined with a suitable amount of water or other aqueous liquid.

In this regard, it should be appreciated that the molds and cores produced by the recovery process of the above-noted U.S. Pat. No. 6,554,049 normally exhibit a better molding properties including hot compression strength, friability resistance, green strength and wet tensile strength than molds and cores made in a conventional way. Although not wishing to be bound by any theory, it is believed that this result is due to the fact that hydraulic separation steps F and G, in addition to recovering the bentonite fraction found in the foundry's bag house dust, also enable this recovered bentonite to fully hydrate before being returned to mold forming station B. In contrast, fresh (prime) bentonite, which is typically in the form of a dehydrated powder when fed to mold forming station B, may not have had sufficient time to fully hydrate before being formed into a mold or core. Because of this difference, it is believed this recycled bentonite provides a better bond strength than fresh (prime) bentonite, because of its higher water content.

In any event, in accordance with this invention, light fraction 78 may be combined with water or other aqueous liquid, either by being combined with effluent output stream 30 exiting second hydraulic separation step G or otherwise, before being recycled to mold forming step B in order to enable the recovered bentonite in this stream to hydrate as much as possible. Dry, powdered bentonite such as found in the bag house dust of a typical green sand foundry normally contains about 0.5-4 wt. % water, while fully hydrated bentonite normally contains about 8-14 wt. % water. In accordance with this invention, light fraction 78 may be combined with water or other aqueous liquid for a time and under conditions which enable the bentonite in this stream to hydrate to a water level of at least 8 wt. %, more typically at least 10 wt. %, at least 12 wt. % or at least 14 wt. % before being recycled to mold forming step B.

As indicated above, light fraction 78 can be combined with effluent output stream 30 exiting second hydraulic separation step G before being recycled to mold forming step B. In some cases, such an approach enables the greatest amount of the valuable ingredients in the bag house dust of a typical green sand refinery to be recovered and reused.

In this regard, molds and cores are normally made from an aqueous slurry of the mold-forming ingredients which is formed into a suitable shape and then dried. In an industrial green sand foundry, a constraining factor in connection with the time it takes to make each mold/core is the amount of water used to make up such a slurry, since greater amounts of water require greater amounts of time for the slurry to dry. Therefore, the amount of water that can be included in such slurries is limited to a practical maximum.

Although the technology of the above-noted U.S. Pat. No. 6,554,049 enables a significant amount of the valuable ingredients contained in the bag house dust of a typical green sand foundry to be recovered and reused, there still remains a significant amount these ingredients which cannot. This is because the process stream which contains most of the recovered bentonite and organics, effluent output stream 30 passing out of second hydraulic separation station G, also contains a significant amount of water. If hydraulic separation stations F and G were operated in such a way that most or all of the bentonite in the bag house dust of a typical green sand foundry were recovered in effluent output stream 30, then the amount of water in this stream would be too much for mold forming station B to handle. The practical effect of this constraint is that the amount of bentonite in the bag house dust of a typical green sand foundry that can be recovered and reused is typically limited to about 10-30 wt. % of the total amount of bentonite present. This constraint may be broken by combining light fraction 78 passing out of dry separation section M with effluent output stream 30 exiting second hydraulic separation step G. As a result, it believed that the amount of bentonite that can be recovered can be substantially increased-approximately doubled-because little or no additional water is needed to produce a slurry 80 that can be easily recycled to mold forming station B while the amount of bentonite in this slurry can be substantially increased.

The invention claimed is:

1. A process for recovering sand, bentonite clay and organic compounds from foundry waste produced by a green sand foundry, the process comprising:

subjecting a first portion of foundry waste to hydraulic separation thereby producing an aqueous fraction rich in bentonite and organic compounds and an underflow fraction rich in coarse sand, subjecting a second portion of foundry waste to dry separation thereby producing a heavy fraction containing coarse sand and a light fraction containing bentonite and organic compounds, and using at least a portion of the bentonite and organic compounds from the aqueous fraction and the light fraction as a raw material for making green sand molds.

2. The process of claim 1, wherein said foundry waste comprises molding waste.

3. The process of claim 1, wherein said foundry waste comprises overflow green sand.

4. The process of claim 1, wherein said foundry waste comprises bag house dust.

5. The process of claim 1, further comprising using the coarse sand in the underflow stream and/or the coarse sand in the heavy fraction for making green sand molds.

6. The process of claim 1, wherein the bentonite and organic compounds from the light fraction are combined with an aqueous liquid before being used for making green sand molds.

7. The process of claim 1, wherein the bentonite and organic compounds in the light fraction are combined with the aqueous fraction before being used for making green sand molds.

8. The process of claim 1, wherein said hydraulic separation includes at least one of flocculation, decanting, use of a cyclone, and centrifugal separation.

9. The process of claim 8, wherein said flocculation comprises adding a polymeric flocculant.

10. The process of claim 1, wherein a green sand mold prepared using the recovered bentonite and organic compounds has a compactability greater than about 45%.

11. The process of claim 1, wherein a green sand mold prepared using the recovered bentonite and organic compounds has a green compression strength greater than about 15.5 N/cm2.

12. The process of claim 1, wherein a green sand mold prepared using the recovered bentonite and organic compounds has a green shear strength greater than about 3.5 N/cm2.

13. The process of claim 1, wherein a green sand mold prepared using the recovered bentonite and organic compounds has permeability greater than about 65.

14. The process of claim 1, wherein a green sand mold prepared using the recovered bentonite and organic compounds has a dry compression strength greater than about 36 N/cm2.

15. The process of claim 1, wherein a green sand mold prepared using the recovered bentonite and organic compounds has a cone jolt toughness greater than about 23.

16. The process of claim 1, wherein a green sand mold prepared using the recovered bentonite and organic compounds has a friability less than about 7.4%.

17. The process of claim 1, wherein said organic compounds include at least one of coal or lignite.

18. A method of forming a molding sand additive, comprising the steps of:

subjecting a first portion of foundry waste to hydraulic separation thereby producing an aqueous effluent stream rich in bentonite and organic compounds, and an underflow stream rich in coarse sand, subjecting a second portion of foundry waste to dry separation thereby producing a heavy fraction containing coarse sand, and a light fraction containing bentonite and organic compounds, and combining the bentonite and organic compounds in both the aqueous effluent stream and the light fraction.

19. The method of forming a molding sand additive of claim 18, further comprising forming a molding sand additive from the recovered bentonite and organic compounds.

* * * * *